(12) United States Patent
Deev

(10) Patent No.: US 10,364,393 B2
(45) Date of Patent: Jul. 30, 2019

(54) PROCESS AND APPARATUS FOR CONTINUOUS PRODUCTION OF DENSIFIED CHARCOAL

(75) Inventor: Alexandre Vladimirovich Deev, Clayton (AU)

(73) Assignee: COMMONWEALTH SCIENTIFIC AND INDUSTRIAL RESEARCH ORGANISATION, Campbell, Australian Capital Territory (AU)

( * ) Notice: Subject to any disclaimer, the term of this patent is extended or adjusted under 35 U.S.C. 154(b) by 998 days.

(21) Appl. No.: 14/128,514

(22) PCT Filed: Jun. 21, 2012

(86) PCT No.: PCT/AU2012/000712
§ 371 (c)(1),
(2), (4) Date: Dec. 20, 2013

(87) PCT Pub. No.: WO2012/174594
PCT Pub. Date: Dec. 27, 2012

(65) Prior Publication Data
US 2014/0110241 A1    Apr. 24, 2014

(30) Foreign Application Priority Data

Jun. 23, 2011    (AU) .................... 2011902460

(51) Int. Cl.
*C10B 37/04*     (2006.01)
*C10B 49/02*     (2006.01)
(Continued)

(52) U.S. Cl.
CPC .............. *C10B 37/04* (2013.01); *C10B 1/04* (2013.01); *C10B 49/02* (2013.01); *C10B 53/02* (2013.01); *Y02E 50/14* (2013.01); *Y02P 20/145* (2015.11)

(58) Field of Classification Search
CPC .......... C10B 1/04; C10B 37/04; C10B 49/02; C10B 53/02; C10B 47/12
(Continued)

(56) References Cited

U.S. PATENT DOCUMENTS

| 1,115,590 A | 11/1914 | Seaman |
| 1,369,428 A | 2/1921 | Hawley |

(Continued)

FOREIGN PATENT DOCUMENTS

| BE | 836515 | 11/1976 |
| CN | 2098502 U | 3/1992 |

(Continued)

OTHER PUBLICATIONS

Hawley, L. F. (1921). The production of artificially dense charcoal. *The Journal of Industrial and Engineering Chemistry*, 13(4), 301-302.
(Continued)

*Primary Examiner* — Matthew D Krcha
(74) *Attorney, Agent, or Firm* — John P. White; Cooper & Dunham LLP

(57) ABSTRACT

The invention relates to an apparatus and method for the production of densified charcoal from organic material that can be used for example as chemical reagents, fuels, or absorbents. The reaction vessel defines a flow path extending from the input to the vessel, through to the output from the vessel, in which the thermal decomposition of the organic material progresses as the organic material passes through the reaction vessel. The vessel includes a reaction zone for autogenous reaction of organic material in a reaction bed of the organic material. Pressure can be applied to the bed of organic material to increase the density of the resultant charcoal. Acoustic emitters may also be used to enhance the densification process.

17 Claims, 2 Drawing Sheets

(51) Int. Cl.
*C10B 1/04* (2006.01)
*C10B 53/02* (2006.01)

(58) Field of Classification Search
USPC ...... 201/32, 34, 36, 40; 202/91, 93, 95, 211, 202/215, 251; 48/86 R
See application file for complete search history.

(56) References Cited

U.S. PATENT DOCUMENTS

| | | |
|---|---|---|
| 1,380,262 A | 5/1921 | Stafford |
| 1,385,826 A | 7/1921 | Hawley |
| 1,593,449 A * | 7/1926 | Hayes ................ C10B 47/12 201/32 |
| 1,639,417 A * | 8/1927 | Wallace ............. C10B 49/04 201/32 |
| 1,756,969 A | 5/1930 | Bergfeld |
| 1,895,284 A | 1/1933 | Hay |
| 2,289,917 A | 7/1942 | Lambiotte |
| 3,110,652 A | 11/1963 | Thomsen |
| 3,962,045 A | 6/1976 | Douglas et al. |
| 4,095,960 A | 6/1978 | Schuhmann, Jr. |
| 4,935,099 A | 6/1990 | Weiss et al. |
| 5,584,970 A | 12/1996 | Schmalfeld et al. |
| 2006/0280670 A1* | 12/2006 | Teeter ................ C10B 49/02 423/445 R |
| 2010/0031571 A1 | 2/2010 | Ershag |

FOREIGN PATENT DOCUMENTS

| | | |
|---|---|---|
| CN | 2763273 Y | 3/2006 |
| CN | 101824348 A | 9/2010 |
| DE | 2520152 A1 | 11/1975 |
| EP | 2 143 780 A1 | 1/2010 |
| FR | 585 299 A | 2/1925 |
| FR | 621350 | 5/1927 |
| JP | H07 300589 A | 11/1995 |
| RU | 2217468 C1 | 11/2003 |
| WO | WO 79/00610 | 8/1979 |
| WO | WO 2012/174587 A1 | 12/2012 |

OTHER PUBLICATIONS

Communication including extended European Search Report, dated Oct. 21, 2014 by the European Patent Office, in connection with European Patent Application No. 12 80 1911.4, Commonwealth Scientific and Industrial Research Organisation.

International Search Report, dated Sep. 3, 2012 in connection with PCT International Application No. PCT/AU2012/000712, filed Jun. 21, 2012.

Written Opinion of the International Searching Authority, dated Sep. 3, 2012 in connection with PCT International Application No. PCT/AU2012/000712, filed Jun. 21, 2012.

Notification Concerning Transmittal of International Preliminary Report on Patentability (Chapter 1 of the Patent Cooperation Treaty), including an International Preliminary Report on Patentability and Written Opinion of the International Searching Authority, dated Jan. 9, 2014 by The International Bureau of WIPO in connection with PCT International Application No. PCT/AU2012/000712, filed Jun. 21, 2012.

Nelson, W.G., "Waste Wood Utilization by the Badger-Stafford Process," *Ind. Chem*. No. 4, vol. 22, pp. 312-315 (1930).

Handbook of charcoal making. Solar Energy R&D in the European Community, Series E, Energy from biomass, v. 7, pp. 1-278 (1985).

* cited by examiner

PROCESS AND APPARATUS FOR CONTINUOUS PRODUCTION OF DENSIFIED CHARCOAL

CROSS-REFERENCE TO RELATED APPLICATIONS

This application is a § 371 national stage of PCT International Application No. PCT/AU2012/000712, filed Jun. 21, 2012, claiming priority of Australian Patent Application No. 2011902460, filed Jun. 23, 2011, the contents of each of which are hereby incorporated by reference in their entirety.

FIELD OF THE INVENTION

The invention relates to a process and apparatus for large-scale production of densified charcoal, which can be used in applications including chemical reagents, fuels and absorbents.

BACKGROUND OF THE INVENTION

One of the primary disadvantages of replacing coal with charcoal in metallurgical or chemical processes is that charcoal has a substantially lower density than comparable coal products. In order to make charcoal more attractive for industrial uses, a method of increasing the charcoal density, while maintaining an economically attractive price, needs to be developed. Ideally, charcoal density needs to be increased by a factor of 2-3 times from a range of 0.2-0.5 $g/cm^3$ (this density range is common to charcoal produced using conventional methods from typical wood sources) to a density of 0.6-1.0 $g/cm^3$.

Producing charcoal with the density greater than charcoal made from conventional raw materials and by a conventional pyrolysis process has been proposed by:
(1) densification of raw materials heated up to 220° C.-250° C. with their subsequent conventional pyrolysis, by for example the use of high-density wood pellets (HDWP) or extruded bars or
(2) pyrolysis of conventional or densified raw materials under constant or pulsating pressure externally applied to thermally decomposing material throughout most of the duration of pyrolysis process.

Methods (1) above, usually employs compression of sawdust, preheated up to 220° C., or sometimes even to 250° C., by pressures in excess of 2,000 bars (e.g. for the pellet machine the pressure may vary between 2,000 bars and 4,500 bars). The process includes converting wood or other organic material into sawdust, conditioning it to the required moisture content and temperature, pelletising or extruding it at high pressure and then cooling it down to the ambient temperature. Subsequently, the densified material undergoes a conventional pyrolysis. Equipment used for such a densification of raw materials is relatively complex and in the case of extruded bars, has a limited productivity.

For this group of methods, no large-scale commercial operations, which could satisfy the needs of metallurgical, chemical or power industries, are known. The use of densified wood products to make high quality charcOal for domestic needs or as an absorbent has been occasionally reported.

Despite the high density of the initial material (e.g. up to 1.3 $g/cm^3$ for HDWP) the density of charcoal obtained from it was modest, around 0.7 $g/cm^3$, because gases and vapours released during the pyrolysis of such a densified material create pores when escaping from the core of the reacting particles.

Method 2 above, includes US patents by Hawley (Hawley, L. F. The Production of Artificially Dense Charcoal. *The Journal of Industrial and Engineering Chemistry* (1921), April, pp. 301-302, U.S. Pat. Nos. 1,369,428, 1,385,826) and Danilov (Russian patent 2217468). In the Hawley patents artificially dense charcoal is produced from sawdust or sawdust briquettes compressed at ambient temperatures using a pressure of at least 2000 bars. The sample was placed in a 2.5" ID externally heated steel pipe and was subjected to pressure exerted by a plunger throughout the duration of the pyrolysis reaction. The applied pressure was either constant or oscillating in nature. In particular, Hawley determined that an oscillating pressure varying between 3.5 bars and 8.5 bars resulted in a final product with a density of at least 0.95 $g/cm^3$.

Hawley also determined that to obtain dense charcoal the pressure applied to the material undergoing pyrolysis may be up to three orders of magnitude lower than that applied to the material at temperatures of up to 220° C. to achieve compression. This effect was associated with a softening of ligno-cellulosic material at the higher temperatures, and therefore a reduction in its mechanical strength, allowing greater compression. Hawley concluded that for common wood species substantial softening occurs within the temperature range of 280° C. to 300° C. (U.S. Pat. No. 1,369,428). Pressure applied to ligno-cellulosic material softened by heating to temperatures in this range, results in greater compression of the material. Hence densified charcoal obtained this way was found to be more dense (less porous) than charcoal obtained by the conventional pyrolysis of densified raw materials (e.g. HDWP).

The process described by Hawley is a batch process. No commercial densified charcoal production methods using this process are known.

Danilov (Russian Patent 2217468) proposed a continuous process for production of dense charcoal. In this process ligno-cellulosic material (preferably sawdust) was initially densified in a screw extruder at temperatures of up to 280° C. and pressures of up to 1200 bars. The material was then directed in to a tubular pyrolysis reactor where it was further compressed by a plunger pushing down on the material and pressurised by pulses of hot high-pressure gases entering the reactor through perforated side walls. The reaction vessel required external heating. No commercial densified charcoal production methods using this process are known.

The methods developed by both Hawley and Danilov had several limitations, in particular the gas permeability of the material became negligible as a result of material densification, therefore the reactor required external heating, as heating the material by hot gas flowing though it was impossible. Furthermore, since the thermal conductivity of the ligno-cellulosic material was very low, the size of the reaction vessel that could be used was limited.

In contrast to the processes described by Hawley and Danilov, where external heating was required, pyrolysis can proceed in a fully autogenous mode, i.e. no external heat is needed, as all the heat required by the process is generated by the reactions occurring with the material itself. In respect to the production of densified charcoal, the use of this autogenous process provides a major advantage in that it allows the temperature distribution across any transverse cross-section of the reaction vessel to be reasonably uniform.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The present invention provides an apparatus in which pyrolysis can proceed in an autogenous mode avoiding at least some of the shortcomings of the prior art. According to one aspect of the invention, there is provided an apparatus for the continuous thermal decomposition of organic material comprising:
- a feeder for supplying organic material to a reaction vessel, the reaction vessel supporting a reaction bed of organic material, the reaction vessel defining a flow path along which the organic material undergoes a carbonisation process as it progresses through the reaction vessel, the reaction vessel comprising:
- a pressure applicator to compact the reaction bed,
- a reaction zone for autogenous reaction of organic material in the reaction bed,
- at least one gas outlet from the reaction zone to extract at least a portion of the pyroligneous gases from the reaction bed,
- a cooling zone to reduce the temperature of the material and to extract heated gas from the reaction bed, and
- at least one discharge port for discharging carbonised organic material from the reaction vessel.

In one embodiment, the reaction zone, cooling zone and discharge port are arranged sequentially along the flow path through the reaction vessel.

It is further preferred that the at least one gas outlet removes gases directly from the reaction bed and may include at least one lance extending into the reaction zone, and more preferably multiple lances.

In a preferred form of the invention, the reaction vessel has a decreasing cross sectional area at least in or in the vicinity of the reaction zone. The preferred form has the inner walls tapering inwardly towards the discharge end of the reaction vessel at least in the vicinity of the reaction zone. This provides a decreasing cross sectional area which compresses the reaction bed as it progresses along the reaction vessel. The vessel may be vertically mounted and so the inner walls taper inwardly down the vessel at least in the vicinity of the reaction zone. Alternatively or in conjunction with the tapering inner walls; the lance or lances which extend from the discharge end of the reaction vessel have a cross sectional area which decreases towards the reaction zone to further compress the reaction bed.

To enable adequate heating of the raw organic material in the heating region of the reaction vessel, the reaction vessel is provided with a gas outlet or outlets above the raw material inlet for the removal of pyroligneous gases. This allows the hot pyrolysis gases and vapours to pass through the entering material to heat it to the temperatures at which autogenous pyrolysis occurs before it is heavily compressed.

To further assist with the compaction of the material located within the reaction zone, but not upstream of this zone, and thus to reduce the maximal pressure, which needs to be applied by the pressure applicator to achieve the required extent of the densification, at least one acoustic emission device for transmitting sound energy into the reaction zone is mounted in proximity to this zone. Preferably the acoustic emission device is positioned on the lance. Another possible positioning of the acoustic device is on the external wall of the reactor. The acoustic-frequency vibrations initiated by these devices will also assist the pyroligneous gases escaping from the compressing reaction bed formed in the vicinity of the reaction zone.

The temperature range at which the ligno-cellulosic material softens is limited to a narrow range. A typical temperature range for softening of wood material is 280° C.-300° C., but simple experimentation can be used to determine the range for any given feed material. As stated earlier, in the absence of heating the lingo-cellulose material to softening temperatures, pressures in excess of 2000 bar are required to densify the unsoftened material prior to pyrolysis.

Further to produce uniform and high quality densified charcoal, it is highly desirable that the temperature distribution across the material in the reactor is uniform. It is desirable that the ligno-cellulosic material within a given transverse cross-section of the reactor (located in the relevant temperature zone) does not deviate outside this temperature range. Non-uniform heating of the ligno-cellulosic material results in segments of ligno-cellulosic material being heated to below the desired temperature range and/or above the temperature range. This results in non uniform density of ligno-cellulosic heated to below the desired temperature range being insufficiently softened and ligno-cellulosic material heated to above the temperature range being partially charred or pyrolysed. If compression of an entire transverse slice of material of non-uniform density is attempted and the pressure increased to compensate for the stiff material, the material may not densify sufficiently in the case of underheated material or shatter in the case of charred material without increasing in density. In either case, once the material has subsequently been pyrolysed, the density of the final product will be an inferior product as it will be less than that of a pyrolysed uniformly dense bed of lingo-cellulose material.

Further the gas permeability through a bed of compressed material of non uniform density will be non uniform. Thus the removal of pyrolysis gases will be more difficult, less predictable and more difficult to control making the overall decomposition of the material less time and energy efficient.

In another form of the invention, there is provided a process for the continuous production of densified charcoal comprising the steps of:
- establishing a reaction bed of organic material undergoing autogenous decomposition in the reaction bed of a reaction zone;
- heating dry organic material and loading the organic material into the reaction vessel;
- heating the loaded dry organic material to a temperature to soften the organic material;
- applying pressure in the range of greater than zero bar to 10 bar to compress the organic material;
- progressing the compressed organic material into the reaction bed zone of the reaction vessel while raising the temperature of the compressed organic material to a temperature at which autogenous decomposition of the organic material occurs;
- retaining the compressed the organic material in the reaction zone for a period to undergo autogenous decomposition; and discharging carbonised organic material from the reaction vessel.

In the above process, it is preferable that the dry material has a moisture content of from 0 to 1 wt %. More preferably, the moisture content of the dry material is from 0 to 0.5 wt %. Even more preferably, the moisture content is less than 0.5 wt %. It is preferable that in the heating zone of the vessel, the organic material is initially heated to a temperature of 280-300° C. to soften the organic material. Gases originating from the autogenous decomposition of the organic material travel counter current to the dry organic material fed into the reaction vessel to heat the organic material to a temperature of 280-300° C. where the ligno cellulose material softens. Ideally the material is heated uniformly across the cross section to provide a uniform softening of the material.

Once organic material is softened and the reaction bed is compressed. The pressure is in the range of greater than zero bar to 10 bar and preferably in the range of 3.5 to 8.5 bar. It is preferred that the pressure is applied mechanically through a plunger and the plunger rotates prior to or during compression to provide a surface level with the surface of the plunger. In this way a substantially uniform thickness for each load of ligno-cellulosic material in the compressed state may be obtained.

Once compressed the pressure is reduced and further dry organic material, preferably initially heated to a temperature of up to 150° C. is fed into the reaction vessel. The fresh material is heated to a temperature between 280-300° C. and the application of pressure to this material then occurs to compress the softened fresh ligno-cellulosic material. The intermittent application of pressure not only compresses the softened fresh material but also progresses the compressed organic material into the autogenous region of the vessel. The compressed material may thus progress as a slug of material into the reaction zone of the reaction vessel where autogenous decomposition occurs to the resultant densified charcoal.

In this way, the process operates continuously with fresh organic material fed at continuous intervals to the reaction vessel and densified charcoal removed at continuous intervals.

In the process of the invention, gases may be removed from the reaction zone through at least one gas outlet, preferably at least one lance which extends into the reaction zone. The amount of gases removed should not be so great as to prevent vapours rising into the heating zone of the reaction vessel where the incoming dry organic material is heated to its softening temperature.

In preferred form, the invention provides a process for the continuous thermal decomposition of organic material in a reaction vessel in which the autogenous decomposition of the organic material has been initiated, the process comprising the steps of:

heating dry organic material and loading the organic material into the reaction vessel;
heating the loaded dry organic material to a temperature to soften the organic material;
applying pressure in the range of greater than zero bar to 10 bar to compress the organic material;
progressing the compressed organic material into the reaction bed zone of the reaction vessel while raising the temperature of the compressed organic material to a temperature at which autogenous decomposition of the organic material occurs;
retaining the compressed the organic material in the reaction zone for a period to undergo autogenous decomposition; and
discharging carbonised organic material from the reaction vessel.

DETAILED DESCRIPTION OF THE EMBODIMENTS

It will be understood that the invention disclosed and defined in this specification extends to all alternative combinations of two or more of the individual features mentioned or evident from the text or drawings. All of these different combinations constitute various alternative aspects of the invention.

The present invention provides an apparatus for autogenous production of densified charcoal, that is charcoal with a density of at least 2 times greater than conventional charcoal.

Dry organic material is loaded into a reaction vessel, passes through the reaction vessel and emerges as densified charcoal. The reaction vessel comprises three main zones, a heating zone, an exothermic reaction zone, and a cooling zone. In the heating zone, the material is heated to an appropriate temperature. Heating can be provided by hot pyroligneous vapours ascending from the lower areas of the reaction vessel, particularly the exothermic reaction zone. In the exothermic reaction zone, the decomposition and/or carbonisation process generates an excess of heat. Pyroligneous vapours may also be formed, which can ascend to the heating zone to heat the organic material in the heating zone. The decomposition process is accompanied by a carbonisation process that progresses as the organic raw material passes through the vessel. Pressure can be applied to the material in the exothermic reaction zone, allowing for densification of the final charcoal product. The pressure may be a mechanical pressure, such as through compression via a plunger type arrangement. Acoustic vibrations may also be provided to the material to enhance compression.

Figure 1:
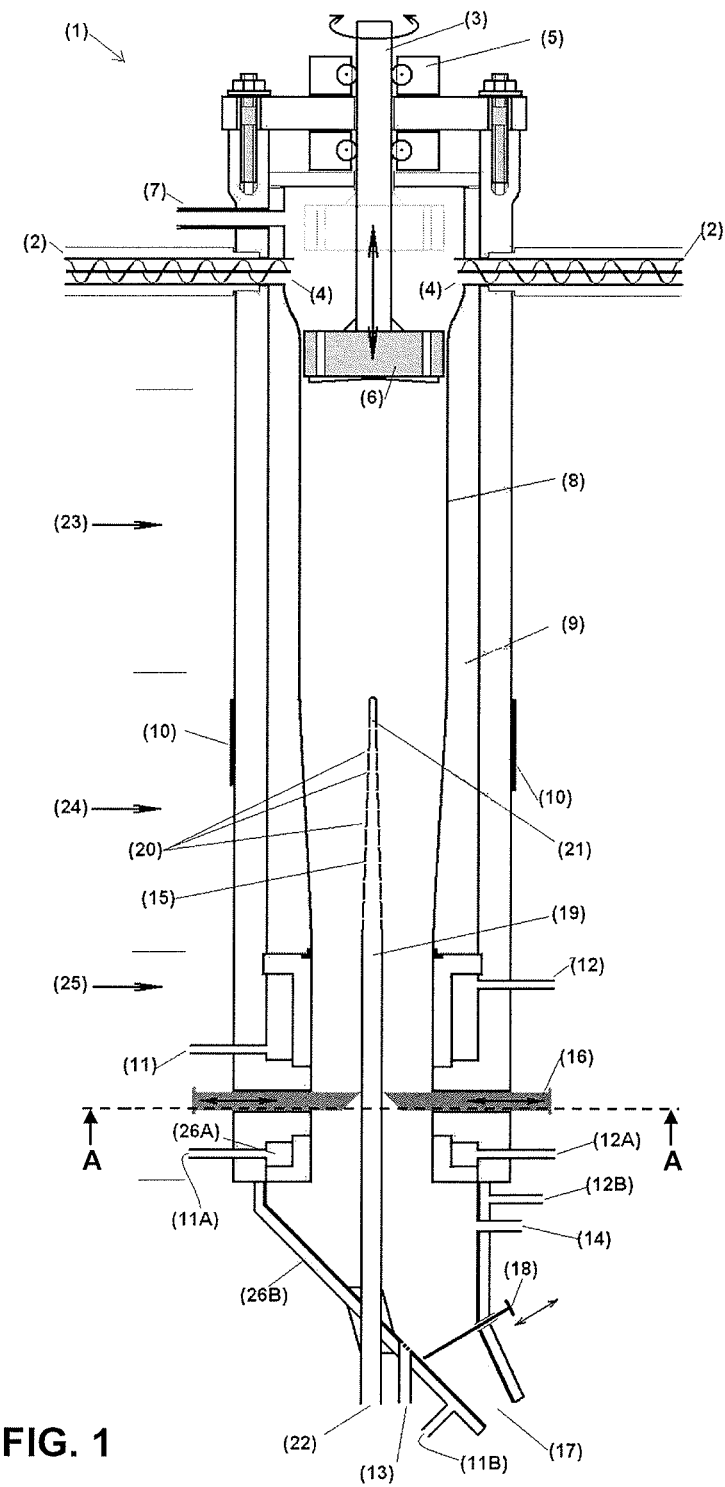
FIG. 1 is a side sectional view of an embodiment of the invention through section B-B of FIG. 2.
Figure 2:
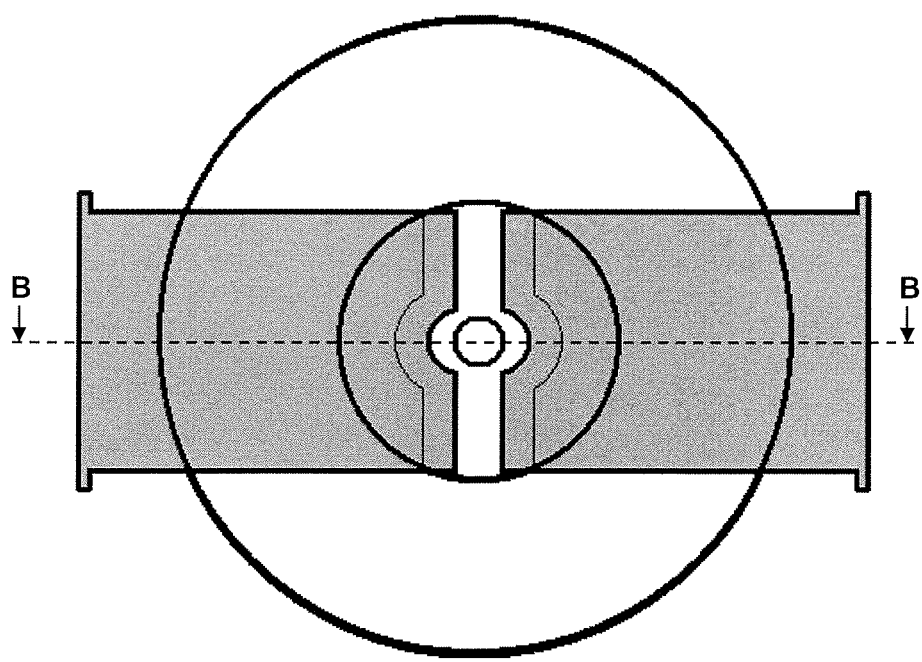
FIG. 2 is a sectional view through section A-A of FIG. 1.

An embodiment of the invention is shown in FIG. 1. The apparatus comprises a reaction vessel [1], at least one organic raw material feeder [2], a plunger shaft [3], at least one inlet [4], a plunger drive [5], a plunger [6], a gas outlet [7], a corrosion resistant lining [8], an insulation layer [9], externally mounted acoustic emitters [10], a cooling water inlet [11], a cooling water outlet [12]; a cooling gas inlet [13], a cooling gas outlet [14], a lance [15], a retractable platform [16], a discharge port [17], gate valves [18], a hollow conduit [19], vapour extraction vents [20], internally mounted acoustic emitters [21], a vapour extraction system [22], a heating zone [23], an exothermic reaction zone [24], a cooling zone [25], cooling water inlets [11A and 11B] for supplying cooling water to cooling water heat exchangers [26A and 26B] with associated cooling water outlets [12A and 12B].

In one embodiment the apparatus comprises a reaction vessel [1] and an organic raw material feeder [2]. The apparatus further comprises appropriate monitoring and control systems.

In the preferred embodiment of the invention, as shown in FIG. 1, the reaction vessel [1] comprises, a reactor wall, an inlet to the reactor and a discharge port for the reaction vessel. The inlet to the reaction vessel is provided with a pressure applicator (plunger [6]) driven by a plunger drive [5] to apply pressure to the material in the reaction vessel.

The reaction vessel further comprises at least one gas outlet for removing at least a portion of the gases directly from the reaction bed. The preferred form includes a lance [15] or lances which protrude from the exterior of into the reaction vessel for extracting gases from the interior of therefrom. The lance or lances comprise a hollow conduit [19], vapour extraction vents [20] that extend along the lance [15] throughout the exothermic reaction zone [24] and are connected at the base of the lance to a vapour extraction system [22]. The lance may further be provided with acoustic emitters [21] that extend along the lance [15] throughout the exothermic reaction zone [24]. Additional acoustic emitters [10] may be mounted on the external surface of the reactor wall opposite to the emitters positioned in the lance.

Operation

The requirements for an autogenous process to occur are:
material loaded into the reaction vessel needs to be dry and preheated to at least 150° C.;
fresh material, entering the reactor from the top, is heated further by hot pyroligneous vapours ascending from the exothermic reaction zone of the reaction vessel to a temperature at which the process becomes exothermic (about 300° C.);
a limited gas permeability of the material is maintained by screening out the very fine fractions; and
the pressure of vapours in the exothermic reaction zone of the reaction vessel may rise substantially over, the ambient pressure; as a result, even limited gas permeability is sufficient for heating gases/vapours to filter through the material upwards, towards the gas/vapour outlet.

An attractive feature of this process is that the main direction of heat transfer is vertical and that heat is generated uniformly across the entire, cross-section of the reactor. Therefore, no horizontal heat transfer is required. This allows the scale-up of the process to be decoupled from the requirements of heat transfer to and within the material. However, at least limited gas permeability in the layers of material located above the exothermic reaction zone is needed so that heat transfer can occur in the vertical direction.

While the loading and discharge of the reaction vessel occurs intermittently, the autogeneous process is conducted continuously. Hence the process is considered to be a continuous process.

The present invention provides a continuous process for the production of densified charcoal, through application of an external mechanical pressure to ligno-cellulosic or other charring carbonaceous material that undergo pyrolysis in a fully autogenous mode.

Conversion of organic raw material to carbonised organic material (charcoal) occurs in an insulated reaction vessel [1] that may be continuously operated. In this embodiment of the invention, the charcoal production apparatus comprises an insulated raw material feeder [2] for supplying organic material to the reaction vessel [1] with a nominally vertical orientation. While a nominally vertical orientation is preferred, it is not necessary. When organic raw material is being loaded into the reaction vessel, the plunger is in the top position. No external pressure is applied during the loading process. However, residual pressure may remain inside the material depending on the configuration of the reactor walls. The reaction vessel [1] can be positioned at any angle, as the flow of vapours inside the reaction vessel [1] are not affected substantially by buoyancy convection.

To establish the autogenous process organic raw material heated to at least 150° C. is fed into the reaction vessel and then the temperature of the material located in the exothermic zone [24] is raised to a temperature greater than 300 C and preferably up to approximately 500° C. by blowing hot gas though it. The preferred gas is heated air. No compression by the plunger [6] should be applied to the material during startup. Hot gas with the temperature of approximately 500° C. is introduced into the exothermic reaction zone [24] preferably through the vents [20] in the lance [15] and the outflow of the gas to occur through the gas outlet [7]. When dry wood in the exothermic reaction zone ignites, the combustion products can also be removed from the reactor through the gas outlet [7]. Both halves of the retractable platform [16], the cooling gas inlet [13] and the cooling gas outlet [14] need to be closed during this operation to prevent the combustion process spreading downwardly instead of upwards. The amount of gas injected needs to be tightly controlled to prevent the overheating of the reaction vessel. When the temperature of the material placed in the exothermic zone [24] reaches approximately 500° C., the flow of gas can be stopped and the reaction vessel [1] may be operated in the autogenous continuous mode with pressure applied to the material.

The reaction vessel [1] converts organic raw material into charcoal through an autogenous process of thermal decomposition. The decomposition process is accompanied by a carbonisation process that progresses as the organic raw material advances from the entrance to the exit of the reaction vessel [1]. Sufficient external mechanical pressure can be applied to the ligno-cellulosic or other charring carbonaceous material to compress material located in the exothermic reaction zone [24], allowing for densification of the final charcoal product. In the course of carbonisation, the material looses from typically 65 to 70% of its initial mass. For a conventional pyrolysis with no densification of the material, the density of charcoal comprises approximately 80% of the density of the wood from which it is made. Hence, the volume of charcoal constitutes approximately 40% of the volume of wood it originates from. If the proposed densification process doubles the density of charcoal, then the volume of the product will be only 20% of the volume of the original wood.

The pressure can be directly applied through use of a plunger drive [5] applying compression via a plunger [6]. Furthermore, lateral wall mounted acoustic emitters [10] and acoustic emitters [21] that extend along the lance [15] in the exothermic reaction zone [24] can be used to generate low frequency acoustic vibrations. These low frequency acoustic vibrations can be applied to selected portions of the material in the reaction vessel [1] to amplify the effect of the compressive pressure exerted by the plunger [6].

The reaction vessel [1] which comprises a series of reaction zones that the material passes through sequentially. In this embodiment, three reaction zones have been designated; a heating zone [23], an exothermic reaction zone [24] and a cooling zone [25].

The organic raw material being fed by the feeder into the heating zone of the reaction vessel is dry and at a temperature of at least 150° C. As material passes through the heating zone [23], it is heated by pyroligneous vapours that ascend from the subsequent zones to a temperature at which the exothermic carbonisation reaction starts (about 300°). Thermal energy from an external source is not required to progress the reaction in the reaction vessel [1].

As material passes through the exothermic reaction zone [24], the organic material decomposes through a fully autogenous pyrolysis process. This converts the organic material into carbonised organic material, pyroligneous vapour, gas and thermal energy. The pyroligneous vapour and gas can ascend to higher zones in the reaction vessel [1] conveying thermal energy to these zones. An external mechanical pressure may be applied through the plunger drive [5] driving the plunger [6] to compress the material in the reaction vessel [1].

The applied mechanical pressure is such that the required level of gas permeability of material upstream of the exothermic reaction zone [24] is maintained, while being sufficient to compress and densify the material located within the exothermic reaction zone [24]. The mechanical pressure may be applied periodically, and may vary from greater than 0 to 10 bars gauge. Furthermore, the pressure distribution within the material in the exothermic reaction zone [24] is optimised by a varying cross-sectional area of the exothermic reaction zone [24]. The lance preferably extends from the discharge end of the reaction vessel preferably up to the reaction zone of the reaction vessel creating an annular cross sectional area which is available for the passage of the reaction bed and product. By inclining or tapering the internal walls of the reaction vessel at least in the area of the reaction zone toward the discharge end of the reaction vessel and narrowing the width of the lance from the discharge end of the reaction vessel towards the reaction zone, the annular space decreases as the reaction bed progresses and the pressure distribution in the reaction chamber is optimised. The mechanical strength of ligno-cellulosic materials reduces with increasing temperature. As a result, the applied mechanical pressure will cause substantial compression of the material in the exothermic reaction zone [24]. A lesser degree of compression will be exhibited by material in the heating zone [23] due to the lower temperature, and therefore higher mechanical strength of material in the heating zone [23]. This ensures that pyroligneous vapours are able to permeate through the heating zone [23] and thus heat the material to the temperature at which the exothermic reaction starts.

Confining the substantial compression of material to the exothermic reaction zone [24] should not prevent the flow of pyroligneous vapours to areas of greater permeability. It is understood that the vapour pressure developed in the material during the pyrolysis process can exceed 30 bars. This is much greater than the applied mechanical pressure and so despite the reduced gas permeability of the compressed material when it enters the exothermic reaction zone [24], pyroligneous vapours are able to permeate out and into the heating zone [23].

As discussed earlier, a gas outlet or outlets remove gases directly from the reaction bed and in the preferred form is a lance in which the lance [15] extends into the exothermic reaction zone [24] and comprises a hollow conduit [19] with vapour extraction vents [20] that extend along the lance [15] throughout the exothermic reaction zone [24]. The vapour extraction vents [20] are connected at the base of the lance [15] to a vapour extraction system [22]. This enables cross-flow of gases and vapours within the exothermic reaction zone [24] of the reaction vessel [2]. To further assist the escape of gases from the reaction zone, acoustic emitters such as high temperature piezo-crystals may be provided on or in the vicinity of the lance. Vapours entrapped within the progressing reaction bed in the exothermic reaction zone are thought to increase porosity of the charcoal. The shortened path for gases and vapours to escape from the exothermic reaction zone [24] with the additional aid of the acoustic irradiation to reduce the porosity of the densified charcoal by enabling a high degree of removal of the vapours entrapped within the exothermic reaction zone [24].

As material passes through the cooling zone [25], it is cooled to a desired temperature. The cooling zone [25] comprises a cooling water inlet [11] for supplying cooling water to a cooling water heat exchanger [26], and a cooling water outlet [12]. The flow of cooling water through the cooling water heat exchanger [26] reduces the temperature of the material as it passes through the cooling zone [25].

The cooling zone further comprises a retractable platform [16]. When the retractable platform [16] is in its retracted state, material is able to pass through the cooling zone [25] and into the discharge port [17]. When the retractable platform [16] is in its extended state, material in the cooling zone [25] is unable to pass into the discharge port [17]. The inner sides of both halves of the retractable platform [16] (the sides directed towards the axis of the reactor) have cutting edges to facilitate the discharge of material if it becomes continuous in the course of its densification.

The carbonised organic material is removed from the reaction vessel [1] through the discharge port [17]. In this embodiment, the discharge from the discharge port [17] is controlled by gate valves [18]. As material passes through the discharge port [17], it is cooled to a desired temperature. The discharge port [17] comprises a water and gas cooling system for cooling the carbonised organic material prior to discharge. The water cooling system comprises cooling water inlets [11A and 11B] for supplying cooling water to cooling water heat exchangers [26A and 26B], and cooling water outlets [12A and 12B]. The gas cooling system comprises a cooling gas inlet [13] and a cooling gas outlet [14]. The cooling gas, introduced through the cooling gas inlet [13], rises through the carbonised organic material in the discharge port [17] and is extracted through the cooling gas outlet [14]. The cooling gas extracts thermal energy from the carbonised organic material through direct contact heat exchange and becomes heated cooling gas.

As used herein, except where the context requires otherwise the term "comprise" and variations of the term, such as "comprising", "comprises" and "comprised", are not intended to exclude other additives, components, integers or steps.

The invention claimed is:

1. An apparatus for the continuous autogenous thermal decomposition of organic material comprising:
    a reaction vessel for supporting a reaction bed of organic material, the reaction vessel defining a flow path along which the organic material undergoes a carbonisation process via an autogenous pyrolysis reaction as it progresses through the reaction vessel, wherein all of the heat required to sustain the pyrolysis reaction in the material is generated by exothermic pyrolysis reactions in the reaction bed; and
    a feeder for supplying organic material to the reaction vessel through an inlet;
    the reaction vessel comprising:
    a pressure applicator to apply pressure to the reaction bed sufficient to compress and densify the reaction bed;
    a reaction zone for autogenous pyrolysis reaction of organic material in the reaction bed to form pyroligneous gases and carbonized organic material;
    at least one gas outlet from the reaction zone to extract pyroligneous gases directly from the reaction bed, wherein the at least one gas outlet from the reaction zone includes at least one lance which extends from the discharge end of the reaction vessel;
    a heating zone in which the pyroligneous gases formed in the reaction zone are allowed to pass through and heat the organic material;
    at least one gas outlet provided above the inlet for the removal of the gases; and
    at least one discharge port for discharging the carbonised organic material from the reaction vessel.

2. The apparatus of claim 1, wherein the reaction vessel has a decreasing cross sectional area at least in or in the vicinity of the reaction zone.

3. The apparatus of claim 2, wherein the inner walls of the reaction vessel taper inwardly towards the discharge end of the vessel.

4. The apparatus of claim 1, further comprising at least one acoustic emission device for transmitting sound energy into the reaction zone.

5. The apparatus of claim 1, wherein the pressure applicator is configured to apply a pressure greater than 3.5 bar to the reaction bed.

6. The apparatus of claim 1, wherein the reaction vessel further comprises a cooling zone to reduce the temperature of the carbonized organic material and to extract heated gas from the reaction bed.

7. A process for the continuous autogenous thermal decomposition of organic material in a reaction vessel in which autogenous decomposition of organic material has been initiated, the process comprising the steps of:
loading dry preheated organic material into the reaction vessel;
allowing pyroligneous gases formed in a reaction zone of the reaction vessel to pass through the dry organic material to heat the loaded dry organic material to a temperature to soften the organic material;
applying pressure to compress and densify the organic material,
wherein the applying of pressure progresses the organic material into the reaction zone of the reaction vessel while the flow of pyroligneous gases through the organic material raises the temperature of the organic material to a temperature at which autogenous decomposition of the organic material occurs;
retaining the compressed organic material in the reaction zone for a period to undergo thermal decomposition into carbonized organic material and pyroligneous gases via an autogenous pyrolysis reaction, wherein all of the heat required to sustain the pyrolysis reaction in the material is generated by exothermic pyrolysis reactions in the reaction bed; and
discharging the carbonised organic material from the reaction vessel,
wherein pyroligneous gases are removed directly from the reaction zone through a lance which extends into the reaction zone.

8. The process of claim 7, wherein once the organic material is compressed, the pressure is reduced and further dry organic material is fed into the reaction vessel.

9. The process of claim 8, wherein the dry organic material is initially preheated to a temperature of up to 150° C. before loading the dry preheated organic material into the reaction vessel.

10. The process of claim 9, wherein the organic material in the reaction vessel is heated to a temperature between 280-300° C. before applying pressure to the organic material.

11. The process of claim 7, wherein the applied pressure is greater than 3.5 bar.

12. The process of claim 7, wherein the applied pressure is in the range of 3.5 to 10 bar.

13. The process of claim 7, wherein the compressed material progresses as a slug of material into the reaction zone of the reaction vessel where autogenous decomposition occurs.

14. The process of claim 7, wherein acoustic vibration is applied to the reaction vessel.

15. The process of claim 7, wherein the organic material comprises wood.

16. The process of claim 7, further comprising actively cooling the carbonised organic material in a cooling zone of the reaction vessel before discharging the carbonised organic material through the discharge port.

17. The process of claim 16, wherein heat is recovered from the cooling zone and used to dry and/or preheat organic material before loading the dry preheated organic material into the reaction vessel.

* * * * *